United States Patent
Konishi et al.

(10) Patent No.: US 12,473,664 B2
(45) Date of Patent: Nov. 18, 2025

(54) MEDICAL SHEET

(71) Applicant: NIPPON ZOKI PHARMACEUTICAL CO., LTD., Osaka (JP)

(72) Inventors: Takafumi Konishi, Osaka (JP); Mitsuru Naiki, Kato (JP); Toshiko Ujita, Osaka (JP); Hitoshi Yamamoto, Ono (JP)

(73) Assignee: NIPPON ZOKI PHARMACEUTICAL CO., LTD., Osaka (JP)

( * ) Notice: Subject to any disclaimer, the term of this patent is extended or adjusted under 35 U.S.C. 154(b) by 469 days.

(21) Appl. No.: 17/790,451

(22) PCT Filed: Jan. 14, 2021

(86) PCT No.: PCT/JP2021/000985
§ 371 (c)(1),
(2) Date: Jun. 30, 2022

(87) PCT Pub. No.: WO2021/145362
PCT Pub. Date: Jul. 22, 2021

(65) Prior Publication Data
US 2023/0066066 A1     Mar. 2, 2023

(30) Foreign Application Priority Data

Jan. 14, 2020 (JP) .............................. 2020-000097U
Jan. 15, 2020 (JP) ................................ 2020-004189
(Continued)

(51) Int. Cl.
*D01F 6/92*     (2006.01)
*A61K 9/70*     (2006.01)
(Continued)

(52) U.S. Cl.
CPC ............... *D01F 6/92* (2013.01); *D01F 6/625* (2013.01); *A61K 9/70* (2013.01); *A61K 9/7007* (2013.01);
(Continued)

(58) Field of Classification Search
None
See application file for complete search history.

(56) References Cited

U.S. PATENT DOCUMENTS

| 5,753,781 A | * | 5/1998 | Oxman | ................... A61K 6/90 523/120 |
| 12,252,824 B2 | * | 3/2025 | Uto | ........................... D01F 6/62 |

(Continued)

FOREIGN PATENT DOCUMENTS

| CN | 102758260 A | 10/2012 |
| JP | 2010-115393 A | 5/2010 |

(Continued)

OTHER PUBLICATIONS

"Molecular Weight of Polymers" (https://chem.libretexts.org/Bookshelves/Organic_Chemistry/Supplemental_Modules_(Organic_Chemistry)/Polymers/ Molecular_Weights_of_Polymers) (webpage retrieved Feb. 25, 2025). (Year: 2025).*

(Continued)

*Primary Examiner* — Vivian Chen
(74) *Attorney, Agent, or Firm* — Oliff PLC

(57) ABSTRACT

A medical sheet has a cell infiltration suppressing action, including a nonwoven fabric formed of fiber containing an aliphatic polyester, and having a porosity of 50 to 90%. The sheet is very useful because it has an excellent neuroprotective and/or nerve regeneration promoting action, which protects nerves by suppressing the infiltration of inflammatory cells such as macrophages and not giving stimulation that adversely affects nerves because body fluids pass there- (Continued)

Sheet A

Sheet B through, by winding around a nerve at a peripheral nerve injury site.

18 Claims, 1 Drawing Sheet

(30) Foreign Application Priority Data

Feb. 25, 2020 (JP) .............................. 2020-000615U
Feb. 25, 2020 (JP) ................................ 2020-029404

(51) Int. Cl.
| | |
|---|---|
| A61K 31/714 | (2006.01) |
| A61K 45/06 | (2006.01) |
| A61L 27/18 | (2006.01) |
| A61L 27/50 | (2006.01) |
| A61L 27/54 | (2006.01) |
| A61L 27/56 | (2006.01) |
| A61L 27/58 | (2006.01) |
| A61L 31/06 | (2006.01) |
| A61L 31/14 | (2006.01) |
| A61L 31/16 | (2006.01) |
| A61P 25/00 | (2006.01) |
| D01F 6/62 | (2006.01) |

(52) U.S. Cl.
CPC ............ *A61K 31/714* (2013.01); *A61K 45/06* (2013.01); *A61L 27/18* (2013.01); *A61L 27/50* (2013.01); *A61L 27/54* (2013.01); *A61L 27/56* (2013.01); *A61L 27/58* (2013.01); *A61L 31/06* (2013.01); *A61L 31/146* (2013.01); *A61L 31/16* (2013.01); *A61L 2300/428* (2013.01); *A61L 2300/604* (2013.01); *A61L 2430/32* (2013.01); *A61P 25/00* (2018.01)

(56) References Cited

U.S. PATENT DOCUMENTS

| | | | | |
|---|---|---|---|---|
| 2003/0060836 | A1* | 3/2003 | Wang ................. | C08G 63/6924 606/152 |
| 2007/0232169 | A1* | 10/2007 | Strickler ................. | A61L 31/16 442/181 |
| 2011/0002880 | A1 | 1/2011 | Takamura et al. | |
| 2011/0020917 | A1* | 1/2011 | Wen ........................ | B05D 3/067 525/50 |
| 2011/0236974 | A1* | 9/2011 | Ogle ....................... | C07K 14/78 524/21 |
| 2013/0210310 | A1* | 8/2013 | Andjelic ................. | B29C 71/00 264/234 |
| 2013/0296239 | A1 | 11/2013 | Takamura et al. | |
| 2015/0265744 | A1 | 9/2015 | Baaijens | |
| 2016/0038645 | A1* | 2/2016 | Pereira Matrins ...... | A61L 15/64 514/420 |
| 2017/0095591 | A1* | 4/2017 | Zuhaib ................... | D01D 5/003 |
| 2018/0050130 | A1* | 2/2018 | Jiang ................... | A61L 27/3633 |
| 2019/0083415 | A1* | 3/2019 | Tanaka ................. | A61K 38/185 |
| 2021/0140081 | A1* | 5/2021 | Uto ........................ | D04H 1/728 |
| 2021/0196445 | A1* | 7/2021 | El-Kurdi ................. | A61L 27/56 |
| 2022/0160929 | A1* | 5/2022 | Daristotle ........... | A61L 26/0019 |
| 2022/0290332 | A1* | 9/2022 | Harimoto ............... | D04H 1/728 |

FOREIGN PATENT DOCUMENTS

| | | | |
|---|---|---|---|
| WO | 2009/072556 | A1 | 6/2009 |
| WO | 2015/157485 | A1 | 10/2015 |
| WO | 2017/154822 | A1 | 9/2017 |
| WO | WO 2020/013199 | A | * 1/2020 |

OTHER PUBLICATIONS

"2.4.5 Polydispersity Index" (excerpt of Chapter 2—Polymerization) Introduction to Plastics Engineering, Shrivastava, A. (editor), William Andrew Publishing, 2018. (Year: 2018).*
Quynh P. Pham; Upma Sharma; Antonios G. Mikos. "Electrospun Poly(E-caprolactone) Microfiber and Multilayer Nanofiber/Microfiber Scaffolds: Characterization of Scaffolds and Measurement of Cellular Infiltration" Biomacromolecules 2006 7 (10), 2796-2805. (Year: 2006).*
F. Yang; R. Murugan; S. Ramakrishna; X. Wang; Y.-X. Ma; S. Wang. "Fabrication of nano-structured porous PLLA scaffold intended for nerve tissue engineering" Biomaterials, vol. 25, Issue 10, 2004, pp. 1891-1900. (Year: 2004).*
Chen-Jung Chang; Shan-hui Hsu. "The effect of high outflow permeability in asymmetric poly(dl-lactic acid-co-glycolic acid) conduits for peripheral nerve regeneration" Biomaterials, vol. 27, Issue 7, 2006, pp. 1035-1042. (Year: 2006).*
Deniz Yucel; Gamze Torun Kose; Vasif Hasirci. "Polyester based nerve guidance conduit design" Biomaterials, vol. 31, Issue 7, 2010, pp. 1596-1603. (Year: 2010).*
Patrick Duffy; Sean McMahon; Xi Wang; Shane Keaveney, et al. "Synthetic bioresorbable poly-a-hydroxyesters as peripheral nerve guidance conduits; a review of material properties, design strategies and their efficacy to date" Biomater. Sci., 2019, 7, 4912-4943. (Year: 2019).*
Benedetta E. Fornasari; Giacomo Carta; Giovanna Gambarotta; Stefania Raimondo. "Natural-Based Biomaterials for Peripheral Nerve Injury Repair" Frontiers in Bioengineering and Biotechnology, vol. 8, pp. 1-26, 2020. (Year: 2020).*
Lauren E. Kokai; Yen-Chih Lin; Nicholas M. Oyster; Kacey G. Marra. "Diffusion of soluble factors through degradable polymer nerve guides: Controlling manufacturing parameters" Acta Biomaterialia, vol. 5, Issue 7, 2009, pp. 2540-2550. (Year: 2009).*
Valeria Chiono; Chiara Tonda-Turo. "Trends in the design of nerve guidance channels in peripheral nerve tissue engineering" Progress in Neurobiology, vol. 131, 2015, pp. 87-104. (Year: 2015).*
Jun. 30, 2023 extended Search Report issued in European Patent Application No. 21741244.4.
Karim A. Sarhane et al., "Macroporous nanofiber wraps promote axonal regeneration and functional recovery in nerve repair by limiting fibrosis", Acta Biomaterialia, 88, (2019), pp. 332-345.
Liang Chen et al., "Preparation of electrospun nanofibers with desired microstructures using a programmed three-dimensional (3D) nanofiber collector", Materials Science & Engineering C, 106, (2020), 110188, pp. 1-10.
Mar. 30, 2021 International Search Report issued in International Patent Application No. PCT/JP2021/000985.
Mar. 30, 2021 Written Opinion issued in International Patent Application No. PCT/JP2021/000985.
May 20, 2023 Office Action issued in Chinese Patent Application No. 202180009268.X.

* cited by examiner

[Fig. 1]

Sheet A

Sheet B

MEDICAL SHEET

TECHNICAL FIELD

The present invention relates to a sheet having a cell infiltration suppressing action, and further relates to a medical sheet having a neuroprotective and/or nerve regeneration promoting action (hereinafter, may be simply referred to as "the present sheet") in peripheral nerve injury treatment.

BACKGROUND ART

When damage is applied to a tissue due to trauma, surgery, disease or the like and inflammation occurs, a pain producing substance, a pain enhancing substance, an inflammatory cytokine or the like is released from an injury site or inflammatory cells, so that spontaneous pain occurs, and an inflammatory reaction is further induced via an axon reflex, and inflammation and pain continue. Depending on the degree of damage, peripheral nerve damage is classified into (1) a case where a transient conduction damage that does not involve rupture of axons and is completely recovered, (2) a case where axons are ruptured, but continuity of Schwann tubes and perineurium is maintained and nerves are gradually regenerated, and (3) a case where axons and epineurium are ruptured and there is no continuity macroscopically, or even if there is, continuity of axons is lost due to scar and is not recovered spontaneously. Among these, peripheral nerve injury that does not spontaneously heal by its own recovery force is basically treated by end-to-end neurorrhaphy of the injured nerve. However, if it takes a long time to recover, irreversible change occurs in muscle tissue, so that it is important to promote regeneration of nerve axon (nerve regeneration). However, as described above, an inflammatory reaction is induced at the injury site, and neural scarring by inflammatory cells such as macrophages is one of factors that hinder nerve regeneration. Therefore, in the treatment of peripheral nerve injury by nerve regeneration, it is an important therapeutic strategy to suppress neural scarring caused by inflammatory cells.

Patent Document 1 discloses a nerve regeneration sheet made of a biodegradable material for regenerating relatively thin nerve fiber such as autonomic nerves, but does not describe or suggest that neural scarring due to inflammatory cells is suppressed for promoting nerve regeneration.

PRIOR ART DOCUMENTS

Patent Documents

Patent Document 1: Japanese Patent Laid-Open No. 2010-115393

SUMMARY OF THE INVENTION

Problem to be Solved by the Invention

An object of the present invention is to provide a medical sheet (the present sheet) that is wound around or placed at a peripheral nerve injury site in a living body, thereby protecting nerves from damaging action of inflammatory cells, suppressing neural scarring, and promoting nerve regeneration. Furthermore, in order to enhance the promoting action of nerve regeneration, the present sheet can appropriately contain a drug or the like, for example, a drug having a therapeutic effect on nerve injury, a drug having an anti-inflammatory action, or the like. The present sheet can be formed of a biodegradable nonwoven fabric that naturally disappears over time, so that it is not necessary to remove the sheet after application to a living body.

Means for Solving the Problems

As a result of intensive studies to achieve the object, the present inventors have found that the object can be achieved by the following inventions.

[1] A sheet comprising a nonwoven fabric formed of fiber containing an aliphatic polyester, wherein a porosity of the sheet is 50 to 90% and the sheet has a cell infiltration suppressing action.
[2] The sheet according to [1], wherein a thickness of the sheet is 30 to 70 μm.
[3] The sheet according to [1] or [2], wherein a weight of the sheet is 0.5 to 10 mg/cm$^2$.
[4] The sheet according to any one of [1] to [3], wherein a density of the sheet is 100 to 1000 mg/cm$^3$.
[5] The sheet according to any one of [1] to [4], wherein the fiber has an average fiber diameter of 300 to 1500 nm.
[6] The sheet according to any one of [1] to [5], wherein the aliphatic polyester contained in the fiber has a molecular weight distribution in which a maximum value exists in at least two or more regions of the molecular weight.
[7] The sheet according to [6], wherein at least one of the regions of the molecular weight is a region of a number average molecular weight of 1000 to 7000 before sterilization treatment.
[8] The sheet according to [6] or [7], wherein at least one of the regions of the molecular weight is a region of a number average molecular weight of 40000 to 150000 before sterilization treatment.
[9] The sheet according to [6] or [7], wherein at least one of the regions of the molecular weight is a region of a number average molecular weight of 50000 to 140000 before sterilization treatment.
[10] The sheet according to any one of [6] to [9], wherein the region of the molecular weight is at least two regions of a region of a number average molecular weight of 1000 to 7000 and a region of a number average molecular weight of 40000 to 150000 before sterilization treatment.
[11] The sheet according to any one of [6] to [9], wherein the region of the molecular weight is at least two regions of a region of a number average molecular weight of 1000 to 7000 and a region of a number average molecular weight of 50000 to 140000 before sterilization treatment.
[12] The sheet according to any one of [6] to [11], wherein, when the aliphatic polyester having a maximum value on a lowest molecular weight side among the aliphatic polyesters contained in the fiber that form the nonwoven fabric is defined as a low molecular weight component and the aliphatic polyester having a maximum value on a highest molecular weight side among the aliphatic polyesters contained in the fiber that form the nonwoven fabric is defined as a high molecular weight component, a mass ratio of a content of the low molecular weight component to a sum of a content of the low molecular weight component and a content of the high molecular weight component in the nonwoven fabric is 0.01 or more and 0.3 or less.
[13] The sheet according to any one of [6] to [11], wherein, when the aliphatic polyester having a maximum value on a lowest molecular weight side among the aliphatic polyesters contained in the fiber that form the nonwoven fabric is defined as a low molecular weight component and the aliphatic polyester having a maximum value on a highest molecular weight side among the aliphatic polyesters contained in the fiber that form the nonwoven fabric is defined as a high molecular weight component, a mass ratio of a content of the low molecular weight component to a sum of a content of the low molecular weight component and a content of the high molecular weight component in the nonwoven fabric is 0.02 or more and 0.2 or less.

[14] The sheet according to any one of [1] to [13], wherein the aliphatic polyester is biodegradable.

[15] The sheet according to [14], wherein the biodegradable aliphatic polyester is at least one selected from the group consisting of polycaprolactone, polycaprolactone diol, polylactic acid, polyglycolic acid, and copolymers thereof.

[16] The sheet according to [14] or [15], wherein the biodegradable aliphatic polyester is at least one selected from the group consisting of polycaprolactone, polycaprolactone diol, and copolymers thereof.

[17] The sheet according to any one of [1] to [16], wherein the cell is an inflammatory cell.

[18] The sheet according to any one of [1] to [17], wherein the sheet has further a neuroprotective and/or nerve regeneration promoting action.

[19] The sheet according to [18], wherein the neuroprotective and/or nerve regeneration promoting action results from suppression of neural scarring.

[20] The sheet according to any one of [1] to [19], wherein the sheet contains further a drug.

[21] The sheet according to [20], wherein the drug is a therapeutic agent for nerve injury.

[22] The sheet according to [21], wherein the therapeutic agent for nerve injury is vitamin B12.

[23] The sheet according to [22], wherein the vitamin B12 is methylcobalamin.

[24] The sheet according to [22] or [23], wherein a content of the vitamin B12 is 0.005 to 0.5 mg per 1 $cm^2$ of the sheet.

[25] The sheet according to [22] or [23] above, wherein a content of the vitamin B12 is 0.0075 to 0.4 mg per 1 $cm^2$ of the sheet.

[26] The sheet according to any one of [1] to [25], wherein the sheet is used by being implanted into a periphery of a nerve injury site in a living body.

[27] The sheet according to any one of [1] to [25], wherein the sheet is used by being wound around a nerve at a nerve injury site in a living body.

[28] The sheet according to [26] or [27], wherein the living body is a human.

[29] The sheet according to any one of [1] to [28], wherein the sheet is subjected to sterilization treatment.

[30] The sheet according to [29], wherein the sterilization treatment is electron beam sterilization or EOG sterilization.

Advantages of the Invention

According to the present invention, it is possible to provide a sheet having an excellent neuroprotective and/or nerve regeneration promoting action, which protects nerves by suppressing the infiltration of inflammatory cells such as macrophages and not giving stimulation that adversely affects nerves because body fluids pass therethrough, by winding around a nerve at a peripheral nerve injury site.

MODE FOR CARRYING OUT THE INVENTION

The present invention provides a sheet (the present sheet) which comprises a nonwoven fabric formed of fiber containing an aliphatic polyester, and has a porosity of 50 to 90%, which is preferable for exhibiting a cell infiltration suppressing action. Due to the structure of the nonwoven fabric or the like, the present sheet has a neuroprotective and/or nerve regeneration promoting action by allowing a body fluid to permeate but suppressing cell infiltration. In addition, the present sheet can be made of a nonwoven fabric formed of fiber containing a biodegradable aliphatic polyester having a molecular weight distribution in which a maximum value exists in at least two or more regions of the molecular weight. The sheet has excellent biodegradability, and can adjust the period of the neuroprotective and/or nerve regeneration promoting action by the present sheet to an appropriate period. In the nonwoven fabric according to the present sheet, fiber is oriented in one direction or randomly in a fiber sheet, a web, or a pad, and paper, woven fabric, knitted fabric, tuft and fulled feltare excluded. In addition, the individual fibers may be in a stacked form, in a form of being entangled, fused, or bonded to each other, or may be a combination of these forms. Furthermore, by containing a drug such as a therapeutic agent for nerve injury in the present sheet, the neuroprotection and/or nerve regeneration promoting effect can be further improved.

Examples of the aliphatic polyester contained in the fiber forming the nonwoven fabric according to the present sheet include biodegradable aliphatic polyesters such as polycaprolactone, polylactic acid, polyglycolic acid, polyglycerol acid, polyhydroxyalkanoic acid, polybutylene succinate, copolymers thereof, or derivatives thereof, and preferably include polycaprolactone or a copolymer thereof, polylactic acid or a copolymer thereof, polyglycolic acid or a copolymer thereof, or a mixture thereof.

In addition, as the aliphatic polyester, those using an arbitrary polymerization initiator such as diol, hydroxy acid or dicarboxylic acid can also be used, and specific examples thereof include poly(ε-caprolactone) diol (may be simply referred to as "polycaprolactone diol".) using propylene glycol or diethylene glycol as a polymerization initiator, polylactic acid dicarboxylic acid using fumaric acid as a polymerization initiator, and the like. Examples of the aliphatic polyester contained in the fiber forming the nonwoven fabric according to the present sheet more preferably include polycaprolactone, polycaprolactone diol or a copolymer thereof, or a mixture thereof.

Further, the fiber forming the nonwoven fabric according to the present sheet is only required to contain at least one or more of the aliphatic polyesters, and may contain a copolymer of a biodegradable polymer other than the aliphatic polyester and the aliphatic polyester. Furthermore, the fiber forming the nonwoven fabric according to the present sheet may contain a copolymer containing a plurality of the aliphatic polyesters. In the case of a copolymer, the form of copolymerization may be any of block copolymerization, random copolymerization, alternating copolymerization, and graft copolymerization.

The aliphatic polyester may have at least two or more maximum values in a molecular weight distribution. In this case, each maximum value (peak of molecular weight distribution) has different values, and has at least two peaks of a peak on a lowest molecular weight side (hereinafter, also referred to as "peak X".) and a peak on a highest molecular weight side (hereinafter, also referred to as "peak Y".). The molecular weight distribution of the aliphatic polyester which is fiber forming the nonwoven fabric according to the present sheet can be obtained by comparison with standard polyethylene glycol/polyethylene oxide using gel permeation chromatography (GPC) in which THF is used as a mobile phase.

The relatively low molecular weight component (hereinafter, also referred to as "low molecular weight component".) constituting the peak X of the aliphatic polyester is presumed to lower melting temperature of the aliphatic polyester fiber and/or lower crystallinity of the aliphatic polyester fiber. Accordingly, the present sheet has excellent biodegradability. In addition, since a part of the low molecular weight component is localized on the fiber surface, fiber decomposition is likely to occur from the surface. On the other hand, a component of relatively high molecular weight (hereinafter, also referred to as "high molecular weight component".) constituting the peak Y of the aliphatic polyester improves mechanical characteristics of the nonwoven fabric, so that the present sheet has excellent structural stability.

When the fiber forming the nonwoven fabric according to the present sheet is made of an aliphatic polyester containing a low molecular weight component and a high molecular weight component, that is, an aliphatic polyester having at least two maximum values in the molecular weight distribution, the aliphatic polyester of a low molecular weight component and the aliphatic polyester of a high molecular weight component may be usually mixed. In this case, it is preferable to use the same kind of aliphatic polyester of a low molecular weight component and aliphatic polyester of a high molecular weight component in terms of affinity. In the aliphatic polyester described above, a polycaprolactone diol synthesized using a diol as a polymerization initiator can be regarded as the same kind as polycaprolactone.

The molecular weight of the low molecular weight component is not particularly limited, but the number average molecular weight before sterilization treatment is, for example, 1000 to 7000, preferably 2000 to 6000, further preferably 2500 to 5000. Also, the weight average molecular weight before sterilization treatment is, for example, 1500 to 12000, preferably 3000 to 10000, further preferably 4000 to 9000.

On the other hand, the molecular weight of the high molecular weight component is not particularly limited, but the number average molecular weight before sterilization treatment is, for example, 40000 to 150000, preferably 50000 to 140000, further preferably 60000 to 130000. Also, the weight average molecular weight before sterilization treatment is, for example, 60000 to 260000, preferably 80000 to 240000, further preferably 100000 to 220000.

The present sheet is preferably sterilized for its intended use, but it has been found that the molecular weight of the aliphatic polyester as a raw material for producing the present sheet is reduced by electron beam sterilization. That is, when the molecular weight of the aliphatic polyester before sterilization is compared with the molecular weight of the aliphatic polyester after sterilization, when electron beam irradiation dose is 20 to 30 kGy, decrease in the molecular weight of the low molecular weight component by about 5 to 10% and that of the high molecular weight component by about 15 to 30% have been confirmed, and it has been found that the molecular weight of the high molecular weight component particularly significantly decreases. The degree to which the molecular weight of the aliphatic polyester decreased was higher than the weight average molecular weight in the number average molecular weight by about 5 to 10%. Therefore, it is assumed that the molecular weights at the peaks X and Y of the present sheet after being subjected to the sterilization treatment are lower than those before the sterilization treatment by about 5 to 10% at the peak X and about 15 to 30% at the peak Y.

The molecular weight of the aliphatic polyester contained in the fiber forming the nonwoven fabric according to the present sheet can be appropriately set to a preferable value according to degree of nerve injury to which the present sheet is applied, a period until disappearance after application, type of a drug such as a therapeutic agent for nerve injury when the drug is contained, speed and period of release of the drug, and the like. Even when a low molecular weight component and a high molecular weight component are blended as the aliphatic polyester, the molecular weight of each component and its blending ratio are not particularly limited and can be appropriately changed according to the use of the present sheet and a drug to be contained in the present sheet described later. By implanting the present sheet into a peripheral nerve injury site and a periphery thereof or winding the present sheet around the nerve, and, if necessary, controlling a release period of the drug from the present sheet or a period until the present sheet is biodegraded and disappears, the effect of nerve protection and regeneration of the present sheet can be more accurately exhibited. In that case, a mass ratio of the content of the low molecular weight component to a sum of the content of the low molecular weight component and the content of the high molecular weight component in the nonwoven fabric is, for example, 0.01 or more and 0.3 or less, preferably 0.02 or more and 0.2 or less. In addition, when the low molecular weight component and the high molecular weight component are within the above ranges, a nonwoven fabric having more excellent uniformity (in particular, uniform fiber diameter) can be obtained.

The aliphatic polyester may have three or more maximum values in the molecular weight distribution, and an upper limit value of the number of maximum values is not particularly limited. Even when having three or more maximum values, it is preferable that the molecular weights of the peak X and the peak Y are each within the above ranges.

The content of the aliphatic polyester in the fiber of the nonwoven fabric according to the present sheet is not particularly limited but is preferably 0.01 to 100% by weight, more preferably 0.5 to 100% by weight, further preferably 25 to 100% by weight relative to the total weight of the fiber.

The average fiber diameter of the fiber of the nonwoven fabric according to the present sheet is not particularly limited, but is preferably 300 to 1500 nm, more preferably 400 to 1300 nm, further preferably 500 to 1000 nm. When the average fiber diameter is 100 nm or more, the present sheet has excellent structural stability, and when the average fiber diameter is 1500 nm or less, the present sheet has excellent flexibility, biodegradability, and cell infiltration suppressing action. The average fiber diameter of the fibers of the nonwoven fabric according to the present sheet can be determined by arithmetically averaging widths in a direction substantially perpendicular to a length direction of about 10 fibers by observing the nonwoven fabric with a scanning electron microscope.

The weight (weight per unit area) of the present sheet is not particularly limited. But, for example, when the present sheet is used for the purpose of treatment of peripheral nerve injury, the weight of the present sheet is preferably 0.5 to 10 mg/cm$^2$, more preferably 0.8 to 5 mg/cm$^2$, further preferably 1 to 3 mg/cm$^2$, in terms of suppressing neural scarring due to inflammatory cells, protecting nerves, and/or promoting nerve regeneration.

The density (weight per unit volume) of the present sheet is not particularly limited. But, for example, when the present sheet is used for the purpose of treatment of peripheral nerve injury, the density of the present sheet is preferably 100 to 1000 mg/cm$^3$, more preferably 200 to 800 mg/cm$^3$, further preferably 250 to 600 mg/cm$^3$, in terms of suppressing neural scarring due to inflammatory cells, protecting nerves, and/or promoting nerve regeneration.

The thickness of the present sheet is not particularly limited. But, for example, when the present sheet is used for the purpose of treatment of peripheral nerve injury, the thickness of the present sheet is preferably 30 to 70 μm, more preferably 35 to 65 μm, further preferably 40 to 60 μm, in terms of suppressing neural scarring due to inflammatory cells, protecting nerves, and/or promoting nerve regeneration, and in terms of application to a nerve injury site such as winding around a nerve. The thickness of the sheet can be determined by measuring thicknesses at three points with a micrometer and arithmetically averaging the measured values.

For example, when the present sheet is used for the treatment of peripheral nerve injury, the porosity of the present sheet is preferably 50 to 90%, more preferably 60 to 80%, further preferably 65 to 75%, in terms of suppressing neural scarring due to inflammatory cells, protecting nerves, and/or promoting nerve regeneration. The porosity of the present sheet can be calculated by the following formula from weight per unit area (1 cm$^2$) of the present sheet and thickness of the present sheet and a specific gravity (e.g. 1.15 g/cm$^3$ for polycaprolactone) of the aliphatic polyester.

$$\text{Porosity (\%)} = (\text{Thickness} - \text{Weight per 1 cm}^2/\text{Specific gravity of aliphatic polyester})/\text{Thickness} \times 100$$

Bending resistance of the present sheet was measured according to JIS L1096 A using a commercially available Gurley bending resistance tester. As a result, since the present sheet is very soft, the bending resistance was less than a minimum reading scale (for example, 0.2 mN), and the bending resistance could not be measured. In other words, the present sheet has such a high flexibility that the bending resistance cannot be measured. Therefore, the present sheet is easily wound around a nerve at a peripheral nerve injury site or placed to cover the site, for example. Even in such a case, the present sheet has an advantage that stimulation that adversely affects nerves and surrounding tissues is not given.

The present sheet may contain components other than the above, and examples thereof include a drug. In particular, the present invention can provide a sheet containing a therapeutic agent for nerve injury in order to further enhance a neuroprotective and/or nerve regeneration promoting effect. When the present sheet containing a drug is applied as a medical device that is indwelled in a living body or inserted into a body for use, the drug can be released into the living body along with decomposition of the nonwoven fabric. The present sheet containing a drug can maintain shape of the nonwoven fabric in the living body for a desired period of time, so that the drug is released as it is decomposed, and further, the nonwoven fabric can be completely decomposed after a desired period of time elapses. A period during which the shape of the nonwoven fabric is maintained in the living body is not particularly limited, but for example, a period of 1 to 12 months. A period until the nonwoven fabric is completely decomposed in the living body is, for example, a period of 6 to 24 months. In the case of containing a drug such as a therapeutic agent for nerve injury, the present sheet can be designed by appropriately setting the period for maintaining the shape of the nonwoven fabric in the living body, the period until the nonwoven fabric is completely decomposed in the living body and the like, according to degree of nerve injury, type of the drug, releasing speed and period of the drug, and the like.

The drug to be contained in the present sheet is not particularly limited, but for example, in the case of a therapeutic agent for nerve injury, examples include vitamin B12 (including a pharmaceutically acceptable salt when the salt is present. The same applies hereinafter). Vitamin B12 includes cobalamin and derivatives thereof. More specific examples thereof include methylcobalamin, cyanocobalamin, hydroxocobalamin, sulfitocobalamin, adenosylcobalamin, and the like, and methylcobalamin, cyanocobalamin, and hydroxocobalamin are preferable, and methylcobalamin is more preferable. The content of vitamin B12 is not particularly limited, but for example, is preferably 0.005 to 0.5 mg, more preferably 0.0075 to 0.4 mg, further preferably 0.01 to 0.3 mg per 1 cm$^2$ of the present sheet. In addition, the content of vitamin B12 relative to 100% by weight of the present sheet is not particularly limited, but for example, is preferably 0.3 to 30% by weight, more preferably 0.45 to 24% by weight, further preferably 0.6 to 18% by weight. The drug may be contained alone or may be contained in combination of two or more thereof. The content of the drug to be contained in the present sheet can be appropriately set according to degree of the disease to be treated, the type of the drug, a period of release, and the like.

The present sheet can be used, for example, by being implanted in a nerve injury site and a periphery thereof or by being wound around a nerve. As described above, since the present sheet is formed to have flexibility, usage mode can be appropriately selected. Specifically, for example, when the present sheet is applied to a patient with nerve injury by surgery, it is preferable that circumference of a nerve of an affected area is peeled off to expose the nerve, and then the present sheet is wound around the circumference of the nerve or placed so as to cover the nerve. By applying the present sheet to a damaged nerve in this manner, it is possible to suppress infiltration of inflammatory cells into nerve tissue, to prevent scarring of nerve tissue due to damaging action of inflammatory cells, and to promote protection and/or regeneration of the damaged nerve. After such application, surrounding tissues are restored and the skin is sutured. The present sheet is flexibly formed, and the present sheet suppresses infiltration of inflammatory cells, but does not give stimulation that adversely affects nerves and surrounding tissues even when placed at a nerve injury site because a body fluid that keeps tissues in a normal state passes therethrough. As such, the present sheet can be used by being wound around a nerve or by being implanted in a periphery of a nerve injury site and does not need to be removed after treatment of the injury site. In particular, when the present sheet is applied to a living body and used, it is preferable to perform sterilization treatment. As the sterilization method, it is preferable to select a method in which the contained drug is not decomposed and the shape and physical properties of the sheet are not impaired, and examples thereof include electron beam sterilization of a radiation sterilization method and ethylene oxide gas (EOG) sterilization.

Since the present sheet has a neuroprotective and/or nerve regeneration promoting action, it is very useful in that both continuous nerve injury having continuity at an injury site and discontinuous nerve injury in which continuity at an injury site is cut off can be treated. Examples of the continuous nerve injury include entrapment neuropathy (a state in which a nerve is compressed by surrounding tissues) such as carpal tunnel syndrome. In addition, the present sheet is also effective for promoting regeneration of a nerve after nerve suturing (directly suturing after nerve injury), a nerve after neurolysis, and a nerve after neural implant (in which a nerve injury site having a defect is subjected to nerve graft to provide continuity). Further, the present sheet also has an effect of promoting treatment of discontinuous nerve injury by being used alone or in combination with an artificial nerve or the like.

The method for producing the nonwoven fabric according to the present sheet is not particularly limited, and a known method can be used. For example, the present sheet can be produced by preparing a solution containing a biodegradable aliphatic polyester, and a drug such as vitamin B12 as necessary, and producing fiber and forming a nonwoven fabric by a known method such as an electrospinning method, a self-assembly method, or a phase separation method. For the preparation of the solution (raw material solution), an appropriate solvent can be used. Examples of the solvent include trifluoroethanol (TFE), 1,1,1,3,3,3-hexafluoro-2-propanol (HIP), chloroform, N,N-dimethylformamide (DMF), and the like, and these can be used alone or in combination. The solvent used in the raw material solution is removed in the spinning step and does not remain in the nonwoven fabric. In addition, various additives can also be used for adjusting electrical conductivity, viscosity, and the like. The electrospinning method using TFE as a solvent is one of preferable production methods in that a nonwoven fabric having a more excellent effect of the present invention is obtained.

In the electrospinning method, the composition for electrospinning is electrically charged by applying a high voltage to produce fiber, and then the fibers are stacked to produce a nonwoven fabric. The method for charging the composition for electrospinning is carried out by connecting an electrode connected to a high-voltage power supply device to the composition for electrospinning itself or a container and applying a voltage. A voltage to be applied is not particularly limited, and is, for example, 10 to 50 kV, more preferably 15 to 45 kV, further preferably 20 to 40 kV. The type of voltage may be either direct current or alternating current. A flow rate of the composition for electrospinning is not particularly limited, and is, for example, 0.2 to 0.8 mL/h, more preferably 0.3 to 0.7 mL/h, further preferably 0.4 to 0.6 mL/h. Also, a needle size is not particularly limited, and is, for example, 24 to 30 G, more preferably 25 to 29 G, further preferably 26 to 28 G. Further, a distance (spinning distance) from the needle to a target electrode is not particularly limited, but is, for example, 5 to 30 cm, more preferably 8 to 25 cm, further preferably 10 to 20 cm.

EXAMPLES

Hereinafter, the present invention will be described in detail based on Examples, but the scope of the present invention should not be interpreted in a limited manner by the following Examples. That is, the scope of the present invention is defined not by the above description or the following examples but by the claims, and it is intended that all modifications within the meaning and scope equivalent to the claims are included.

Example 1. Production of Present Sheet

Polycaprolactone having a number average molecular weight of 101000 measured by a gel permeation chromatography method (average value of n=2) (also referred to as "101 kPCL" in the present example.) and polycaprolactone diol having a number average molecular weight of 3865 measured by the same method (average value of n=2) (also referred to as "3.9 kPCL diol" in the present connect.) were prepared.

101 kPCL and 3.9 kPCL diol were dissolved in trifluoroethanol (TFE) at a ratio of (A) 9:1 and (B) 8:2 so that total concentration of 101 kPCL and 3.9 kPCL diol was (A) 7.2% by weight and (B) 8.1% by weight relative to 100% by weight of TFE, respectively, to prepare compositions for electrospinning. Furthermore, a composition for electrospinning in which, for example, methylcobalamin as a drug, which is a therapeutic agent for nerve injury, was added in an amount corresponding to 0.3 to 30% by weight relative to total of 101 kPCL and 3.9 kPCL diol was separately prepared. In both of the cases A and B, the content of methylcobalamin per 1 $cm^2$ of the produced sheet was 0.005 to 0.5 mg, and the content of methylcobalamin relative to 100% by weight of the produced sheet was 0.3 to 30% by weight.

The prepared compositions for electrospinning A and B were spun using an electrospinning device to produce sheets A and B made of nonwoven fabrics. At this time, a needle (27 G) was used as an ejector, a distance from the needle to the target electrode was set to 17 cm, ejection speed was 0.5 mL/h, and applied voltage was set to 30 kV. As a result of measuring thickness, weight and density of the produced sheets, the thickness, weight and density of each of the sheets A and B were 30 to 70 μm, 0.5 to 10 mg/$cm^2$, and 100 to 1000 mg/$cm^3$, respectively. Further, when porosity was calculated based on the formula described above (i.e., Porosity (%)=(Thickness−Weight per 1 $cm^2$/Specific gravity of aliphatic polyester)/Thickness×100 using the measurement results of the thicknesses and the weight per 1 $cm^2$ of the sheets A and B, the porosity of each of the sheets A and B was 50 to 90%.

Example 2. Scanning Electron Microscopy Observation

Figure 1:
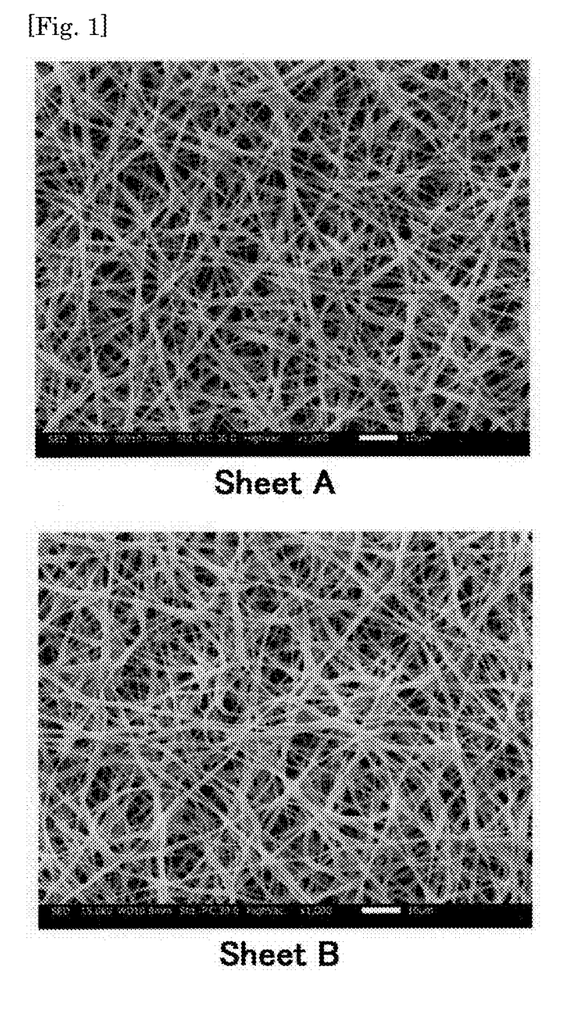
FIG. 1 is a scanning electron micrograph of sheets A and B produced in Example 1.

Scanning electron micrographs of the sheets A and B produced in Example 1 were shown in FIG. 1. Also, as a result of measuring diameters of 10 fibers of the sheets A and B from the electron micrographs, the fiber diameter of the sheet A was 319.2 to 1974.0 nm, and the fiber diameter of the sheet B was 336.5 to 1333.0 nm. The average fiber diameter (±standard deviation) was calculated for each. As an example of the result, the average fiber diameter of the sheet A was 933.6 (±457.9) nm, and the average fiber diameter of the sheet B was 799.0 (±328.7) nm.

Example 3. Cell Infiltration Inhibition Test

For three sheets with different production numbers (production lots) (Production No. 1, Production No. 2, Production No. 3) of the sheet A produced in Example 1 and the sheet A' obtained by immersing the sheet in phosphate buffered saline (PBS) for one month (hereinafter, also referred to as "PBS immersion sheet"), respectively, cell infiltration inhibiting ability was confirmed by the following test method.

(1) Preparation of PBS Immersion Sheet (Sheet A')

The present sheet was immersed in 100 mL of PBS per sheet at 37° C.±1° C. (consequent humidity) for 1 month under light shielding conditions. The whole amount of the sheet and the PBS immersion liquid after immersion was placed in a filter upper layer portion of a filter system (Serial No.: 430770, Corning Incorporated), and was gently filtered by suction. An inner wall surface of the filter system upper layer portion and the sheet on the filter were washed with about 10 mL of sterilized purified water (Japanese Pharmacopoeia) 10 times under gentle suction filtration. The sheet was placed on sterilized filter paper and naturally dried in a clean bench for 12 hours or more.

(2) Preparation of Insert

A membrane attached to the cell culture insert (Production No.: CBA-102 (Part No. 10201), CELL BIOLABS, INC.) was peeled off. Next, the sheet A or the sheet A' cut out into a circular shape with a diameter of about 2.5 cm was attached using white petrolatum (KENEI Pharmaceutical Co., Ltd) so as to cover the bottom surface to the side surface of the insert, and a Parafilm was wound around the side surface of the insert to hold each sheet. Similarly, three inserts to which a membrane with a pore size of 0.4 µm was attached were prepared as a negative control, and three inserts to which a membrane with a pore size of 5 µm was attached were prepared as a positive control.

(3) Cell Invasion Inhibition Test

A cell suspension was prepared using a serum-free medium (RPMI 1640, 10% fetal bovine serum (FBS)) so that the concentration of THP-1 cells (human monocyte-derived cell line, American Type Culture Collection) was $1.5 \times 10^6$ cells/mL. 500 µL of a fetal bovine serum (chemotactic factor)-containing medium (RPMI 1640, 10% FBS) was placed in each well of a 24-well plate, each insert (3 inserts each) was overlaid thereon, and 100 µL of a cell suspension was added to an upper layer of each insert. In each of the sheet A, the sheet A', the negative control and the positive control, one obtained by adding a serum-free medium to the upper layer of the insert was each prepared as a blank control. These 24-well plates were shielded from light by aluminum foil as necessary, placed in a carbon dioxide gas incubator (37.0° C., 5% $CO_2$), and cultured for 18 hours.

After the culture, each insert lower layer was observed using a phase contrast microscope. A cell suspension on the upper surface of the insert was removed, and the insert was transferred to a new 24-well plate containing 400 µL of Cell Detachment Solution, and incubated under conditions of 37.0° C., 5% $CO_2$ for 30 minutes, and then the cells attached to the lower surface of the insert were suspended. Next, 400 µL of a culture medium containing invasive cells remaining in the plate after culture was added to the well from which the insert had been removed, and mixed. 180 µL of each mixed solution was transferred to a 96-well plate, and 60 µL of the prepared 4× Lysis Buffer/Cyquant GR Dye mixed solution (Cyquant GR Dye: 4× Lysis Buffer=1:74) was added to each well, and the plate was allowed to stand at room temperature under light-shielding conditions for 20 minutes. After standing, fluorescence intensity of the mixed solution of each well was measured using a fluorescence microplate reader (SpectraMax Gemini XPS, Molecular Devices Japan K. K) under a condition of Excitation/Emission=480/520, and the number of cells of each of the sheet A, the sheet A', the negative control and the positive control was calculated. After the cell infiltration inhibition test, an appropriate amount of a 0.1% methylene blue solution was dropped onto the upper layer of the insert to which the sheet was attached, and it was confirmed that there was no leakage of the methylene blue solution from the side surface of the insert. As an example of the result, the number of infiltrating cells in the sheet A is shown in Table 1, and the number of infiltrating cells in the sheet A' is shown in Table 2.

TABLE 1

| | Number of cells moved to insert lower layer of sheet A (cells) | | |
|---|---|---|---|
| Production No. 1 | Less than $2.50 \times 10^3$ | Less than $2.50 \times 10^3$ | Less than $2.50 \times 10^3$ |
| Production No. 2 | Less than $2.50 \times 10^3$ | Less than $2.50 \times 10^3$ | Less than $2.50 \times 10^3$ |
| Production No. 3 | Less than $2.50 \times 10^3$ | Less than $2.50 \times 10^3$ | Less than $2.50 \times 10^3$ |
| Negative control | Less than $2.50 \times 10^3$ | Less than $2.50 \times 10^3$ | Less than $2.50 \times 10^3$ |
| Positive control | $2.53 \times 10^4$ | $2.70 \times 10^4$ | $2.96 \times 10^4$ |

TABLE 2

| | Number of cells moved to insert lower layer of sheet A' (cells) | | |
|---|---|---|---|
| Production No. 1 | Less than $2.50 \times 10^3$ | $2.94 \times 10^3$ | Less than $2.50 \times 10^3$ |
| Production No. 2 | $3.09 \times 10^3$ | Less than $2.50 \times 10^3$ | $2.66 \times 10^3$ |
| Production No. 3 | $2.83 \times 10^3$ | Less than $2.50 \times 10^3$ | $2.53 \times 10^3$ |
| Negative control | Less than $2.50 \times 10^3$ | Less than $2.50 \times 10^3$ | Less than $2.50 \times 10^3$ |
| Positive control | $3.62 \times 10^4$ | $3.69 \times 10^4$ | $3.57 \times 10^4$ |

As is apparent from Table 1, for the unused sheets A, cell permeation was suppressed as in the negative control. In addition, as is apparent from Table 2, for the sheets A' immersed in PBS on the assumption of being implanted in a living body for 1 month, there was a tendency to slightly permeate cells as compared with the negative control, but since the number of permeated cells was ¹/₁₀ or less as compared with the positive control, it was confirmed that both the sheet A and the sheet A' suppressed the permeation of cells. From the above results, it was confirmed that, when the present sheet is applied to a nerve of a peripheral nerve injury site and a periphery thereof, the present sheet has usefulness of preventing neural scarring by suppressing infiltration of inflammatory cells such as macrophages and exhibiting a neuroprotective and/or nerve regeneration promoting action. Furthermore, by comparing the results of the sheet A and the sheet A', it was confirmed that, regarding the infiltration suppressing action of the present sheet on inflammatory cells, the strongest action was confirmed at the initial stage when the present sheet was applied in the living body, and it was confirmed that the action tended to be gradually weakened as biodegradability progressed.

Example 4. Body Fluid Permeability Test

With respect to the present sheets of Production Nos. 1 to 3 (the same sheets as the sheet A of Example 3), body fluid permeability was confirmed by the following test method for measuring permeability of an albumin solution.

In the same manner as in Example 3, the present sheet of each production number and a membrane with a pore size of 0.4 µm as a comparison sample were attached to an insert (1 each). 500 µL of Dulbecco's phosphate buffered saline (DPBS) was placed in each well of a 24-well plate and each insert was overlaid thereon. From the upper layer of the insert, 100 µL of a 3% human serum albumin (HSA) solution prepared using DPBS was added. This 24-well plate was shielded from light by aluminum foil as necessary, placed in a carbon dioxide gas incubator (37.0° C., 5% $CO_2$), and allowed to stand for 18 hours. After standing, the solution in each insert lower layer was collected as a sample solution. In addition, for each sample (the sheets of Production Nos. 1 to 3 and the comparison sample), one sample obtained by adding 100 μL of DPBS to the upper layer of the insert was prepared, and the sample was allowed to stand under the same conditions, and then the solution of the lower layer of the insert was used as a blank solution. Furthermore, a solution obtained by adding 500 μL of DPBS and 100 μL of a 3% HSA solution to a 24-well plate without overlaying the insert, and allowing the plate to stand under the same conditions was used as a target solution (assumed to be a sample solution when HSA equilibrated inside and outside the insert).

For each of the standard solution (each concentration diluted solution of an HSA standard stock solution), the sample solution, the blank solution, and the target solution, colorimetric quantification was performed using BCA Protein Assay Kit (Thermo Fisher Scientific), a calibration curve was prepared using absorbance of the standard solution, and protein concentration in the measurement solution was calculated (average value of n=2). After completion of the test, an appropriate amount of a 0.1% methylene blue solution was dropped onto the upper layer of the insert to which the sheet was attached, and it was confirmed that there was no leakage of the methylene blue solution from the side surface of the insert. As an example of the results, HSA concentrations of the sample solutions and the target solution are shown in Table 3. The result of HSA concentration of the blank solution in each sample was equal to or less than the lower limit of quantitation (25 μg/mL).

TABLE 3

|  | HSA Concentration (μg/mL) |
| --- | --- |
| Production No. 1 | 3895 |
| Production No. 2 | 3819 |
| Production No. 3 | 3945 |
| Comparison Sample | 2162 |
| Control solution | 4320 |

As is apparent from Table 3, since the HSA concentrations of the sample solutions of the present sheets of Production Nos. 1 to 3 were higher than that of the sample solution of the comparison sample, it was confirmed that the present sheet tended to permeate more HSA than the comparison sample. In addition, since the HSA concentration of the sample solutions of the present sheet were not significantly different from the HSA concentration of the control solution, it was confirmed that permeability of HSA hardly changed depending on the presence or absence of the present sheet. From the above results, it has been confirmed that the present sheet sufficiently permeates a body fluid in a living body, and thus has usefulness of not giving stimulation that adversely affects nerves in neuroprotection and/or nerve regeneration promotion.

The invention claimed is:

1. A sheet comprising a nonwoven fabric formed of fiber containing a biodegradable aliphatic polyester, wherein a porosity of the sheet is 50 to 80% and the sheet has a cell infiltration suppressing action,
   wherein a thickness of the sheet is 30 to 70 μm,
   wherein the biodegradable aliphatic polyester contained in the fiber has a molecular weight distribution in which a maximum value exists in at least two or more regions of the molecular weight,
   wherein the sheet further contains a drug, and
   wherein a density of the sheet is 200 to 800 mg/cm$^3$.

2. The sheet according to claim 1, wherein a weight of the sheet is 0.5 to 10 mg/cm$^2$.

3. The sheet according to claim 1, wherein a density of the sheet is 250 to 600 mg/cm$^3$.

4. The sheet according to claim 1, wherein the fiber has an average fiber diameter of 300 to 1500 nm.

5. The sheet according to claim 1, wherein at least one of the regions of the molecular weight is a region of a number average molecular weight of 1000 to 7000 before sterilization treatment.

6. The sheet according to claim 1, wherein at least one of the regions of the molecular weight is a region of a number average molecular weight of 40000 to 150000 before sterilization treatment.

7. The sheet according to claim 1, wherein the region of the molecular weight is at least two regions of a region of a number average molecular weight of 1000 to 7000 and a region of a number average molecular weight of 40000 to 150000 before sterilization treatment.

8. The sheet according to claim 1, wherein, when the biodegradable aliphatic polyester having a maximum value on a lowest molecular weight side among the biodegradable aliphatic polyesters contained in the fiber that form the nonwoven fabric is defined as a low molecular weight component, and the biodegradable aliphatic polyester having a maximum value on a highest molecular weight side among the biodegradable aliphatic polyesters contained in the fiber that form the nonwoven fabric is defined as a high molecular weight component, a mass ratio of a content of the low molecular weight component to a sum of a content of the low molecular weight component and a content of the high molecular weight component in the nonwoven fabric is 0.01 or more and 0.3 or less.

9. The sheet according to claim 1, wherein the biodegradable aliphatic polyester is at least one member selected from the group consisting of polycaprolactone, polycaprolactone diol, polylactic acid, polyglycolic acid, and copolymers thereof.

10. The sheet according to claim 1, wherein the cell is an inflammatory cell.

11. The sheet according to claim 1, wherein the sheet has further a neuroprotective and/or nerve regeneration promoting action.

12. The sheet according to claim 11, wherein the neuroprotective and/or nerve regeneration promoting action results from suppression of neural scarring.

13. The sheet according to claim 1, wherein the drug is a therapeutic agent for nerve injury.

14. The sheet according to claim 13, wherein the therapeutic agent for nerve injury is vitamin B12.

15. The sheet according to claim 14, wherein a content of the vitamin B12 is 0.005 to 0.5 mg per 1 cm$^2$ of the sheet.

16. The sheet according to claim 1, wherein the sheet is used by being implanted into a periphery of a nerve injury site in a living body.

17. The sheet according to claim 1, wherein the sheet is used by being wound around a nerve at a nerve injury site in a living body.

18. The sheet according to claim 1, wherein the thickness of the sheet is from 35 to 65 μm.

\* \* \* \* \*